Patented Nov. 21, 1950

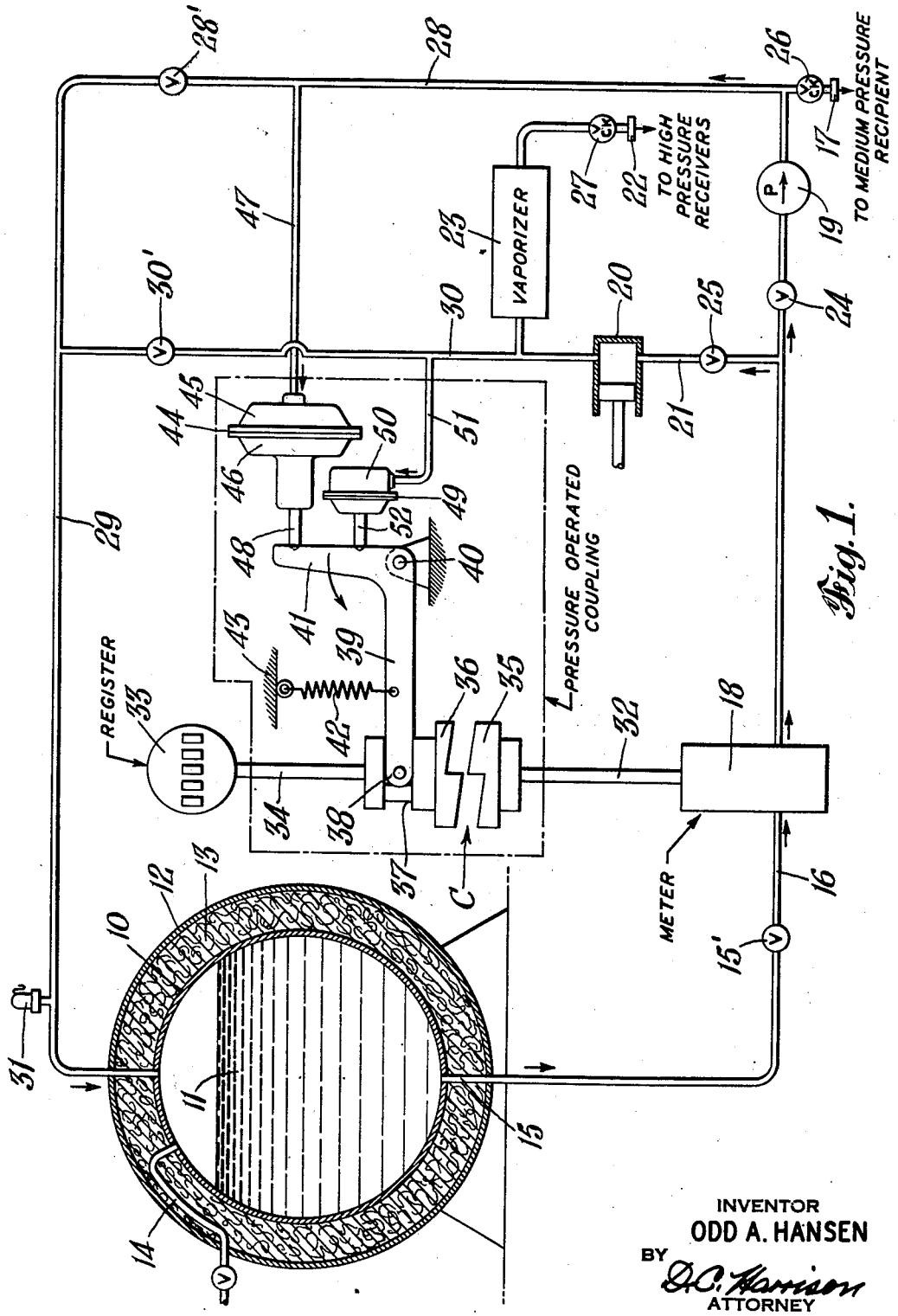

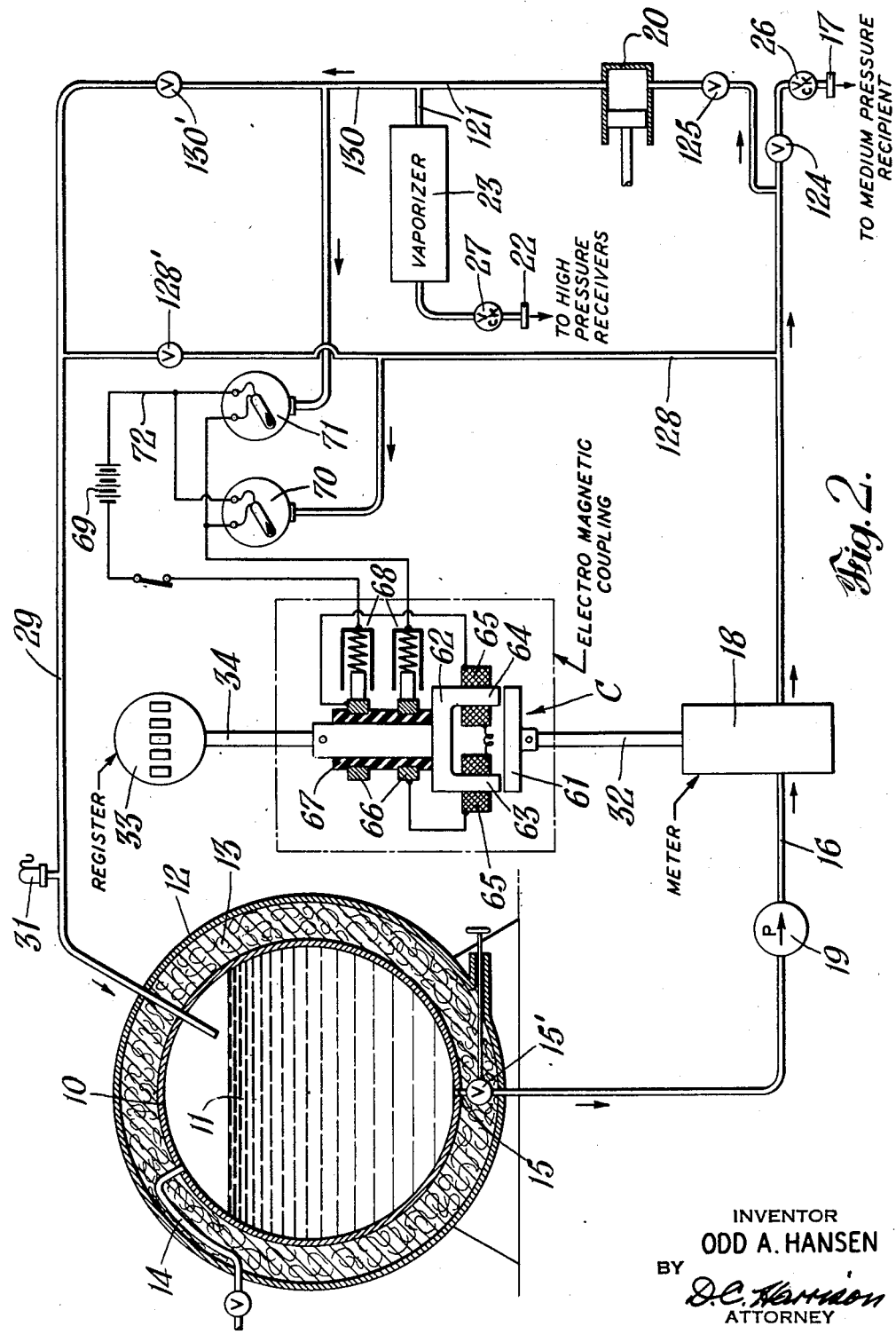

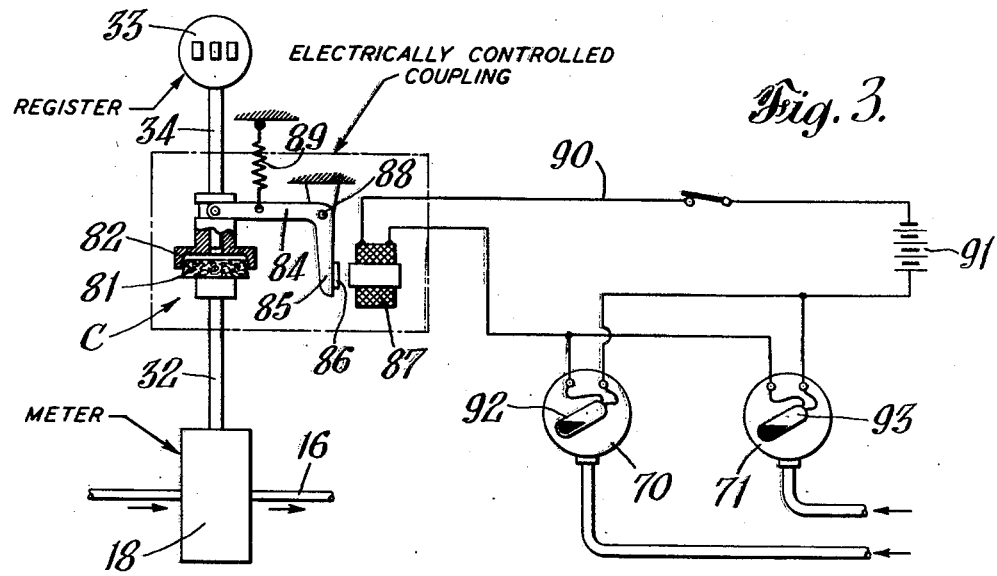
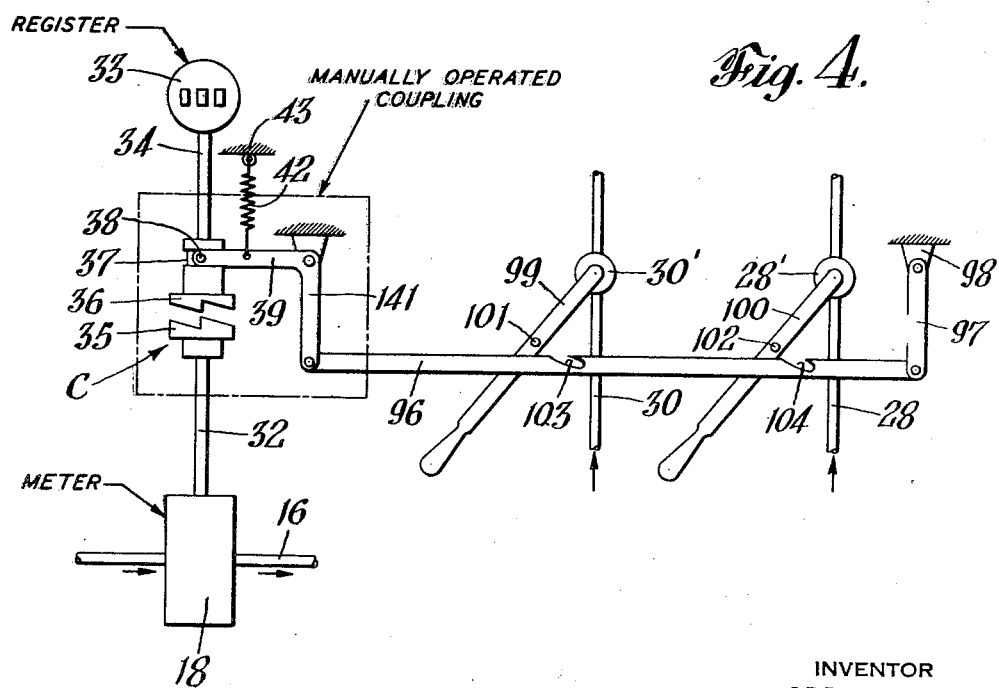

2,530,521

UNITED STATES PATENT OFFICE 2,530,521

SYSTEM FOR DISPENSING MEASURED QUANTITIES OF LIQUEFIED GAS

Odd A. Hansen, Kenmore, N. Y., assignor to The Linde Air Products Company, a corporation of Ohio Application August 25, 1947, Serial No. 770,485

15 Claims. (Cl. 62—1)

This invention relates to a system for accurately metering quantities of liquefied gas when transferred from a supply container to a recipient, and more particularly to the metering of a liquefied gas having a boiling point at atmospheric pressure below 233° K. such as liquid oxygen or nitrogen when delivered to any type of recipient.

A principal object of the present invention is to provide an improved system for metering exactly the amount of a highly volatile liquefied gas when transferred from a container in which a supply is held at a very low temperature to a receiving means at any desired pressure. More specifically, it is an object of the invention to provide apparatus for preventing false registration by a positive displacement liquid meter when it is used to meter a portion of liquefied gas being transferred. Another object of the present invention is to provide a system for delivering accurately metered quantities of liquefied gas from a supply container to receiving means at a high pressure or to receiving means at either a high delivery pressure such as over 150 P. S. I. gauge or at a low pressure such as below about 150 P. S. I. gauge depending upon the type of receiving means to be served.

The system of the present invention is particularly advantageous for metering liquid oxygen and liquid nitrogen which have very low boiling points and are difficult to preserve in the liquid state. When such a liquefied gas is transferred from one container to another it is often essential to determine the exact amount transferred and various unsatisfactory expedients to determine such amount have been resorted to, such as weighing either the supply vessel or the recipient before and after a quantity is transferred, or by measurements of liquid levels before and after the transfer. To be accurate, the former is very inconvenient, and the latter is subject to great inaccuracy.

A liquefied gas can be metered by passing it through the metering elements of a positive displacement liquid meter of a type adapted to be used with the particular low temperature liquefied gas. Such a meter has metering elements including a metering chamber and movable elements in the chamber such as pistons, or nutating plate, or rotary elements, the movement of which is in exact proportion to the amount of liquid passed through the metering chamber. The amount of liquid passed is recorded by a register mechanism that is driven by the movable elements. A suitable construction of a meter for liquid oxygen or liquid nitrogen may be similar to that described in the copending application Serial No. 508,270 filed October 29, 1943 by R. M. Thayer, now patent No. 2,453,766. However, a meter for use in the system of the present invention need not have a cooling jacket surrounding the metering chamber.

In order that the amount of liquefied gas transferred may be accurately registered, it is necessary that the movable elements of the meter shall be moved only by the liquid transferred and not by any vapors. The liquefied gases are substantially at their boiling point temperature and always tend to remain at such boiling point because heat flows toward them even though the container is provided with the best-known heat insulation. With such a liquefied gas any leakage of heat to the liquid causes vaporization, and also any reduction of pressure likewise causes vaporization. Thus it is found that any heat leak to, or reduction of pressure on, such a liquefied gas before it has passed through the metering chamber will result in the passage through the meter of an indefinite amount of vapor along with the liquid transferred. Such vapor will move the metering elements and cause false registration.

Heretofore when liquefied gas was pumped from a supply container to receiving means at a high pressure such as above 150 P. S. I. gauge it was not possible to accurately meter the amount so transferred. One method of arriving at the amount delivered was to measure the pressure in and temperature of a fixed size receiver before and after charging and then calculate the quantity. Even if a meter could be constructed to withstand high pressures, the liquefied gas after being raised to a high pressure such as, for example, 2000 P. S. I., is in a state in which it does not have the properties of a true liquid.

According to the present invention the above difficulties are solved by providing a system including a transfer line leading from the liquid space of a supply container to a delivery connection, which delivery connection may be coupled to a recipient to be charged with liquefied gas or to a recipient to be charged with gas produced by vaporizing liquefied gas under pressure. Interposed in the transfer conduit is a positive displacement liquid meter particularly designed for operation by liquefied gas. This meter may have no cooling jacket but its register drive connection is provided with a normally disengaged coupling. The system includes means for causing a flow of liquefied gas through the transfer conduit, such as a means to create pressure difference, or preferably a pump interposed in the transfer conduit on either side of the meter chamber when the pump is of the low pressure type such as a rotary pump. When the pump is of the high pressure type such as a reciprocating plunger pump, the pump is interposed in the transfer conduit after the meter. The system is further provided with means for precooling the meter and priming the pump in the form of a valve-controlled by-pass from the transfer conduit to the supply container. When the by-pass valve is opened, a flow of liquefied gas passes through the metering chamber and the pump when the pump is operated. The meter does not register any of the by-passed gas material but the meter becomes cooled to the temperature of the liquefied gas and the pump is primed so that no generation of vapors can thereafter occur to cause false registration. When the by-pass is closed the coupling of the register drive is simultaneously engaged and then all liquid passing through the metering chamber toward the delivery connection is accurately metered and the exact quantity thereof is registered.

According to the invention, means is provided for automatically engaging the registering coupling to the metering elements immediately upon the start of flow at the delivery connection to the recipient, and further according to the invention, high pressure pump deliveries can also be metered because the metering chamber is located at the inlet side of the high pressure pump. A system is thus provided which can deliver accurately metered amounts of liquefied gas to any type of recipient. The recipients may be of the low pressure type such as a liquefied gas storage container, or of a medium pressure type such as a cold converter that stores liquefied gas at pressures generally below 150 P. S. I. gauge and converts portions of such liquid to gas as and when required, or of the high pressure type such as a vaporizer coupled to high pressure storage receivers that may operate at pressures of 2000 P. S. I. or higher.

These and other objects and novel features of the invention will become apparent from the following description having reference to the annexed drawings, in which:

Figs. 1 and 2 are schematic views of two embodiments of systems for transferring metered quantities of liquefied gas according to the principles of the present invention; and Figs. 3 and 4 are fragmentary schematic views showing alternative arrangements of means for effecting engagement of the meter register coupling when the by-pass valves are closed.

Referring now to the drawings and particularly to Fig. 1, an exemplary system may include a supply container 10 holding a body of liquefied gas 11. The container 10 may be of the customary construction in which it is surrounded by an outer shell 12 providing an insulating space filled with highly efficient insulation 13. Such container will be provided with a filling connection 14 and a liquid discharge connection 15. A transfer conduit 16 leads from the discharge connection 15 to a delivery connection 17. The delivery connection 17 may be in the form of a detachable coupling in the event that the apparatus is a portable apparatus adapted to service recipients located at various places. The liquid discharge 15 is provided with a stop valve 15'.

Interposed in the transfer conduit 16 is the metering chamber 18 of a liquefied gas meter, and also interposed in the transfer conduit 16 is a pump 19 which is of the low pressure type and of a construction particularly suited for moving low temperature liquefied gas. A suitable pump, for example, is a rotary pump similar to that disclosed in my U. S. Patent No. 2,340,747. As previously mentioned, this pump could be interposed in the transfer conduit 16 on either side of the metering chamber 18, but it is on the discharge side in the embodiment of Fig. 1. In order to serve high pressure receivers, there is provided a high pressure reciprocating type of pump 20 interposed in a branch 21 of the transfer conduit 16, which branch is connected thereto on the downstream side of the metering chamber 18. The branch 21 leads to a second delivery connection 22 and if it is desired that warm high pressure gas should be delivered at the connection 22 a vaporizer 23 may also be interposed in the branch 21. The vaporizer 23 could be heated by any suitable means. The pump 20 may, for example, be of the type shown and described in my U. S. Patent No. 2,292,375.

For controlling delivery to the connections 17 and 22 stop valves 24 and 25 are provided respectively at the inlets of the pump 19 and the pump 20. The delivery connections 17 and 22 are also preferably provided with non-return or check valves 26 and 27 respectively. In order to prime the pumps and cool the meter, by-pass connections are also provided. One such by-pass 28, controlled by a stop valve 28', leads from the transfer conduit 16 on the discharge side of the pump 19 and meter 18 to a gas phase connection 29 of the supply vessel 10. For priming the high pressure pump a by-pass connection 30 controlled by a valve 30' is connected between the branch transfer conduit 21 on the discharge side of the pump 20 to the gas phase connection 29. The gas phase connection 29 may be provided with a relief valve 31 set to release gas in the event of pressures occurring in the supply container 10 which are higher than the upper limit of its working pressure.

The metering chamber 18 has metering elements therein of any suitable construction, as previously mentioned, and the movable elements are connected to rotate a drive shaft 32 extending upwardly from the metering chamber 18. A register 33 for the meter is preferably located in a warm region spaced from the metering chamber 18 and has a portion of a drive shaft 34 extending toward the drive shaft portion 32. A disengageable coupling, indicated generally at C, of any suitable construction, may be provided to couple the drive shaft portions 32 and 34. In Fig. 1 a toothed type of coupling is illustrated, one element 35 of which is fixed to the upper end of the shaft portion 32 and the other element 36 of which is axially slidably mounted on the lower part of the drive shaft portion 34. The elements 35 and 36 are formed with teeth on their engageable faces so as to couple the shafts in driving relation when the movable element 36 is moved into engagement with the element 35. Suitable means is provided for shifting the movable element 36. To this end the element 36 has a grooved hub portion 37, the groove of which receives the operating ends 38 of a forked lever 39. The lever 39 is fulcrumed at a pivot mounting 40 and is provided with a bell crank arm 41. A spring 42 may be connected between the lever arm 39 and a frame portion 43 in order to normally keep the coupling C disengaged.

One means of effecting engagement of the coupling is illustrated in Fig. 1. This comprises a fluid responsive device 44 such as a diaphragm enclosed between chambers 45 and 46, the chamber 45 being in pressure communication through a tube 47 with the discharge side of the pump 19, the tube 47 being connected to the by-pass 28 below the valve 28'. The diaphragm of the fluid pressure responsive device 44 operates a plunger 48 that extends through the chamber 46 and engages the bell crank arm 41 to rotate it counterclockwise when the pressure on the discharge side of the pump 19 becomes sufficient to overcome the spring resistance.

The coupling is operated also by a similar pressure responsive device 49 having a pressure chamber 50 connected by tube 51 to the by-pass 30 below the valve 30'. The pressure responsive device 49 has a plunger 52 which is forced outward against the lever arm 41 by pressure acting in the chamber 50. The pressure responsive devices 44 and 49 thus act independently and either one or both can effect engagement of the coupling C.

The operation of the system disclosed in Fig. 1 is believed clear from the above description. When it is desired to deliver liquefied gas from the delivery connection 17 the valves 25 and 30' will remain closed, the valves 15', 24, and 28' are opened, and the pump 19 is started. A circulation of liquefied gas will then flow from connection 15 through the transfer conduit 16, the meter 18, the pump 19, and liquid and vapor driven before the liquid will flow through the by-pass 28 and line 29 back to the container 10. Since the valve 28' is opened, the pressure in the conduit 28 will be too low to operate the pressure responsive means 44 and the metering elements in the metering chamber 18 will operate freely while they are being cooled to the low temperature of the liquefied gas. When the metering chamber 18 is thoroughly cooled and the pump 19 has operated sufficiently to be primed, the valve 28' is closed, thereupon the pressure will build up in the by-pass 28 sufficiently to operate the pressure responsive device 44 to extend the plunger 48, move the bell crank 39 against the resistance of the spring 42, and thus engage the coupling C. The delivery connection 17 having previously been coupled to a receiving container, the liquid discharged by the pump 19 will then flow through the check valve 26 and to the recipient. During flow to the recipient only liquid will pass through the metering chamber 18 and all the liquid delivered will be metered. As soon as the desired amount has been delivered, the valve 28' can again be opened, which will release the pressure in the by-pass 28 and cause the coupling C to immediately disengage. The valve 15' is then closed and any remaining liquid in the conduits and pump may be allowed to pass back to the container 10 without affecting the register of the meter.

If it is desired to deliver gas to high pressure receivers coupled to the delivery connection 22, the valves 24 and 28' will remain closed and the valves 25 and 30' will be opened and the pump 20 operated until the meter chamber is thoroughly cooled and the pump 20 is fully primed. Then upon closing the valve 30', pressure will build up in the by-pass 30, the device 49 will cause the coupling C to be engaged, and liquid under pressure will then flow through the vaporizer 23 to be heated and the high pressure receivers will be filled to the desired pressure.

Since the meter is on the suction side of the high pressure pump 20, the liquid passing through the metering chamber 18 will be always at the same pressure and be unaffected by any change of pressure on the discharge side of the pump.

In another embodiment of the invention as illustrated in Fig. 2, similar parts will be designated by similar reference characters. Thus in Fig. 2 the liquid from the vessel 10 is dischargeable through the connection 15 and valve 15' to the transfer conduit 16 which connects with a delivery connection 17. Interposed in the conduit 16 is the metering chamber 18 and the pump 19, but in this case the pump 19 is located between the meter and the connection 15. A by-pass 128 is connected between the conduit 16 on the discharge side of the meter 18 and the gas phase connection 29, such by-pass being provided with a stop valve 128'. The high pressure pump 20 in this embodiment is interposed in a branch 121 of the transfer conduit 16 leading to the delivery connection 22. The branch 121 also connects to the conduit 16 on the discharge side of the meter 18 and there is preferably provided a control valve 125 at the inlet of the pump 20 and a control valve 124 in conduit 16 near the delivery connection 17. The vaporizer 23 may be interposed in the branch 121 after the pump and there is provided a by-pass 130 having a stop valve 130' connecting the discharge side of the pump 20 to the gas phase connection 29.

The means for operating the disengageable coupling between the register 33 and the metering chamber 18 may be of any desired construction and is illustrated in Fig. 2 as being of the magnetic type. Here the upper end of the shaft portion 32 has secured thereto an iron cross-bar 61. The lower end of the shaft portion 34 has secured thereto a U-shaped electromagnet 62, the ends 63 and 64 of which are closely adjacent but do not touch the cross-bar 61. These ends are provided with magnet windings 65 connected electrically to a pair of slip rings 66 mounted on an insulating bushing 67 on the upper part of the electromagnet 62. Suitable contact brushes 68 make electrical contact with the slip rings 66. One of the brushes 68 is connected electrically with a source 69 of electric energy and the other brush is connected to one terminal each of pressure switches 70 and 71. The other terminal of each pressure switch is connected to the electrical supply source 69 by wire 72. The pressure switches 70 and 71 are in pressure communication respectively with the by-pass conduits 128 and 130.

The operation of the system of Fig. 2 is substantially similar to the operation of the system of Fig. 1. The positioning of the metering chamber 18 on the discharge side of the pump 19 insures that any drop of pressure in the liquefied gas passing through the meter will cause no vapor formation that might cause false registration when the pump is delivering to the delivery connections 17 or 22. In Fig. 2 the pump 19 is employed to act as a first-stage pump for the high pressure pump 20 and thus the pump 20 can be of a more simple construction and still efficiently pump liquid to the high pressure. The meter is located in a region where the liquefied gas pressure passing therethrough is substantially constant.

When liquid is to be delivered from the connection 17 the valves 15' and 128' remain open until the pump 19 is primed and the meter is fully cooled. Then valve 124 is opened and valve 128' is closed. The check valve 26 provides sufficient back pressure to operate the pressure switch 70 which closes its contacts so as to energize the electromagnet 62. The electromagnet 62 will then magnetically couple itself with the rotating bar 61 and rotate in unison therewith. The register 33 will then be driven proportionally to the amount of liquid flowing through the metering chamber 18 to the delivery connection 17. If delivery to high pressure receivers at the delivery connection 22 is desired, valve 124 will remain closed and valves 125 and 130' are opened. Since the resistance through the plunger pump 20 may be too great, the valve 128' may also be opened until the pump 19 and meter 18 are fully primed and cooled down. The pump 20 is then operated, after which the valve 128' can be closed without the occurrence of a pressure in the by-pass 128 sufficient to operate the pressure switch 70. After the pump 20 is fully primed the by-pass valve 130' is also closed and then delivery of liquid will begin at the delivery connection 22. The pressure in the by-pass 130 will build up enough to operate the pressure switch 71 which in turn causes the electromagnet coupling to become magnetically engaged.

Figs. 3 and 4 show alternative coupling operating means, thus Fig. 3 illustrates another form of electrically controlled coupling comprising a coupling in the form of a clutch having a conical friction element 81 secured to the upper end of the shaft portion 32 for engagement with a movable cup element 82 that is slidably secured to the upper shaft portion 34. The movable element 82 is liftable by the forked ends of a bell crank lever 84. The lever 84 has an arm 85 carrying the armature 86 of an electromagnet 87. The bell crank is pivoted to the frame at 88 and a spring 89 is provided between the frame and lever 84 to normally keep the clutch disengaged. The electromagnet is energized by a circuit 90 including a source 91 of electric power and the switches 92 and 93 of pressure operated switches 70 and 71.

The register coupling may also be manually operated, as illustrated in Fig. 4. In Fig. 4 the movable coupling element 36 is operated by the bell crank 39 having a lever 141 pivoted to a horizontally swinging bar 96. The other end of the bar 96 is pivoted to a link 97 suspended from a portion 98 of the frame. The stop valves 30' and 28' are preferably of the plug cock type, and are provided with operating levers 99 and 100 respectively. The levers 99 and 100 are provided at an intermediate point of their length with outstanding pins 101 and 102. These pins are positioned to engage with notches 103 and 104 cut in the bar 96 at locations so that they will be engaged by the pins 101 and 102 respectively when the valve levers 99 and 100 are swung downwardly into alignment with the by-pass pipes 30 and 28 respectively. In Fig. 4 the valves 30' and 28' are arranged to be open when the levers 99 and 100 stand outward away from alignment with the pipes 30 and 28 respectively. Thus whenever either of the valves is shut off manually the respective pin 101 or 102 will engage its corresponding notch 103 or 104 and pull the bar 96 to the right. This will move the bell crank 39 to shift the movable element 36 down into engagement with the element 35 and thus close the coupling. The coupling is closed simultaneously with the shutting off of the by-pass stop valve.

It will be understood that the apparatus described herein may be modified, and that other changes may be made without departing from the spirit and scope of this invention, as defined in the appended claims.

What is claimed is:

1. Apparatus for accurately metering a quantity of low-boiling liquefied gas when transferred from a supply container to a recipient, which apparatus comprises a transfer conduit connected between a supply container holding a body of the liequefied gas at low temperature and a delivery connection to receiving means; means associated with the apparatus for effecting a flow of a portion of the liquefied gas through said transfer conduit; a liquid meter of the positive displacement type adapted to meter low temperature liquefied gas having a metering chamber and elements therein interposed in said transfer conduit, said meter having a register mechanism and register driving means connected between the metering elements and the register including a disengageable coupling interposed in said driving means; a valve-controlled by-pass passage communicating with said transfer conduit on the downstream side of said metering chamber for by-passing a portion of liquefied gas from the container through said meter to a region other than said delivery connection to cool the meter while the coupling is disengaged; and means responsive to the flow of liquefied gas to said delivery connection and connected to actuate said coupling for engaging the coupling when the quantity of liquefied gas to be transferred is being flowed through said transfer conduit and meter to said delivery connection.

2. Apparatus for accurately metering a quantity of low-boiling liquefied gas when transferred from a supply container to a recipient, which apparatus comprises a transfer conduit connected between a supply container holding a body of the liquefied gas at low temperature and a delivery connection to receiving means; means associated with the apparatus for effecting a flow of a portion of the liquefied gas through said transfer conduit; a liquid meter of the positive displacement type adapted to meter low temperature liquefied gas having a metering chamber and elements therein interposed in said transfer conduit, said meter having a register mechanism and register driving means connected between the metering elements and the register including a disengageable coupling interposed in said driving means; a valve-controlled by-pass passage communicating with said transfer conduit on the downstream side of said metering chamber for by-passing a portion of liquefied gas from the container through said meter to a region other than said delivery connection to cool the meter while the coupling is disengaged; and mechanism operably connected to said valve-controlled by-pass passage and to said coupling and constructed and arranged for substantially simultaneously engaging said coupling while stopping the by-pass flow of liquid through the meter when cooling same whereby only the quantity of liquefied gas flowed to said delivery connection is registered.

3. Apparatus for accurately metering a quantity of low-boiling liquefied gas when transferred from a supply container to a recipient, which apparatus comprises a transfer conduit connected between a supply container holding a body of the liquefied gas at low temperature and a delivery connection to receiving means; liquefied gas pumping means interposed in said transfer conduit; a liquid meter of the positive displacement type adapted to meter low temperature liquefied gas having a metering chamber and elements therein interposed in said transfer conduit, said meter having a register mechanism and register driving means connected between the metering elements and the register including a disengageable coupling interposed in said driving means; a by-pass connection between said transfer conduit and said supply container for returning a portion of liquefied gas after passage through pump and meter; a control valve in said by-pass; and means operable when said control valve is closed for engaging said coupling; whereby the by-passed liquid is not registered, the meter and pump are pre-cooled, and subsequent flow of liquefied gas to the delivery connection is accurately metered and registered.

4. Apparatus for accurately metering a quantity of low-boiling liquefied gas when transferred from a supply container to a recipient according to claim 3, in which the meter is positioned between the pump means and the supply container so that the meter is not subjected to the pump discharge pressure.

5. Apparatus for accurately metering a quantity of low-boiling liquefied gas when transferred from a supply container to a recipient according to claim 3, in which the pump means is of the rotary type and is interposed between the meter and the supply container and which includes a high pressure pump interposed in said transfer conduit between the meter and said delivery connection.

6. Apparatus for accurately metering a quantity of low-boiling liquefied gas when transferred from a supply container to a recipient according to claim 3, in which said last-named means comprises a mechanical interlock between the operator of said control valve and said coupling.

7. Apparatus for accurately metering a quantity of low-boiling liquefied gas when transferred from a supply container to a recipient according to claim 3, in which said last-mentioned means comprises a pressure-responsive device connected to close said coupling upon the attainment of a preselected pressure, and a pressure connection between the device and the transfer conduit side of said control valve.

8. Apparatus for accurately metering a quantity of low-boiling liquefied gas when transferred from a supply container to a recipient according to claim 3, in which said coupling is electrically controlled and said last-mentioned means comprises a pressure switch responsive to a preselected pressure in the transfer conduit side of said control valve, said pressure switch being electrically connected with a power source and the electrical control element of said coupling.

9. An apparatus for dispensing metered amounts of a low-boiling liquefied gas comprising a supply container holding a body of liquefied gas at low temperature; a transfer conduit from the liquid space of said supply container to a delivery connection; a pump and meter for liquefied gas interposed in said transfer conduit, said meter having a register mechanism and a register driving means including a normally disengaged coupling; a by-pass connected between said supply container and said delivery conduit on the discharge side of said pump and meter, said by-pass having a control valve; and means for engaging said coupling when said control valve is closed during operation of said pump.

10. An apparatus for dispensing metered amounts of a liquefied gas according to claim 9 in which said pump is a low pressure pump between the supply container and meter.

11. An apparatus for dispensing metered amounts of a liquefied gas according to claim 9 in which said pump is a high pressure pump and said meter is between the supply container and the pump.

12. An apparatus for dispensing metered amounts of a liquefied gas according to claim 9 in which said pump is a low pressure pump between the supply container and the meter; and which also includes a high pressure pump having its inlet connected to the transfer conduit on the discharge side of said meter and its outlet connected to a second delivery connection.

13. An apparatus for dispensing metered amounts of a liquefied gas according to claim 9 in which said pump is a low pressure pump and in which said apparatus also includes a high pressure pump interposed in said transfer conduit after the meter.

14. An apparatus for dispensing metered amounts of a liquefied gas according to claim 9 in which said pump is a low pressure pump and in which said apparatus also includes a high pressure pump having its inlet connected to said transfer conduit after the meter and its outlet connected to a second delivery connection.

15. An apparatus for dispensing metered amounts of a liquefied gas according to claim 9 in which said pump is a low pressure pump between the supply container and the meter; and which also includes a high pressure pump having an inlet connected to the transfer conduit on the discharge side of said meter and an outlet connected to a second delivery connection, said by-pass being connected to the transfer conduit between the meter and the high pressure pump, and a second by-pass with a second control valve therein connected to the outlet of said high pressure pump.

ODD A. HANSEN.

REFERENCES CITED

The following references are of record in the file of this patent:

UNITED STATES PATENTS

| Number | Name | Date |
| --- | --- | --- |
| 2,007,251 | Kniskern | July 9, 1935 |
| 2,018,857 | Kniskern | Oct. 29, 1935 |